(12) United States Patent
Phillips

(10) Patent No.: US 7,731,094 B2
(45) Date of Patent: Jun. 8, 2010

(54) METHOD AND APPARATUS FOR PERSONALIZING CONTACTLESS CARD WITH SWITCH

(75) Inventor: Simon Phillips, York (GB)

(73) Assignee: Mastercard International, Inc., Purchase, NY (US)

( * ) Notice: Subject to any disclaimer, the term of this patent is extended or adjusted under 35 U.S.C. 154(b) by 728 days.

(21) Appl. No.: 11/702,714

(22) Filed: Feb. 6, 2007

(65) Prior Publication Data
US 2008/0011859 A1 Jan. 17, 2008

Related U.S. Application Data

(60) Provisional application No. 60/831,354, filed on Jul. 17, 2006.

(51) Int. Cl.
*G06K 19/06* (2006.01)
(52) U.S. Cl. .................................................. 235/492
(58) Field of Classification Search .................. 235/451, 235/487, 492
See application file for complete search history.

(56) References Cited

U.S. PATENT DOCUMENTS

| | | | |
|---|---|---|---|
| 6,863,220 B2 | 3/2005 | Selker | |
| 7,578,431 B2 * | 8/2009 | Tanner et al. | 235/375 |
| 2006/0168802 A1 * | 8/2006 | Tuttle | 29/825 |
| 2006/0266831 A1 * | 11/2006 | Kozlay | 235/451 |
| 2006/0289657 A1 * | 12/2006 | Rosenberg | 235/492 |
| 2007/0290051 A1 * | 12/2007 | Bielmann et al. | 235/492 |

* cited by examiner

*Primary Examiner*—Daniel A Hess
(74) *Attorney, Agent, or Firm*—Buckley, Maschoff & Talwalkar LLC (57) ABSTRACT

An identification token is provided which includes a radio frequency identification (RFID) integrated circuit (IC), an antenna and a switch. The switch is normally in a first state and is actuatable by a user's finger to a second state different from the first state. The identification token includes a conductive connection connected to at least one of the RFID IC and the antenna. The identification token is enabled to send and receive signals so long as the conductive connection is unbroken. The identification token is subjected to a personalization process and the conductive connection is broken after or during the personalization process. After the conductive connection is broken, the switch operates to switch the identification token between operative and inoperative states. Before the conductive connection is broken, the switch is actuatable but actuating the switch does not change the state of the identification token.

28 Claims, 10 Drawing Sheets

METHOD AND APPARATUS FOR PERSONALIZING CONTACTLESS CARD WITH SWITCH

CROSS-REFERENCE TO RELATED APPLICATION

This application claims the benefit of U.S. Provisional Patent Application Ser. No. 60/831,354, filed Jul. 17, 2006, which is incorporated herein in its entirety.

BACKGROUND

Many payment cards, such as credit or debit cards, are being deployed with contactless or proximity technologies. For example, MasterCard International Incorporated has developed specifications and guidelines for its member banks to issue PayPass® payment cards. These payment cards have a radio frequency identification (RFID) chip and an antenna encapsulated in the plastic payment card body. The payment card body has the payment card number and other information embossed on one face and may have a magnetic stripe on the other face of the card. A cardholder may simply wave or tap the payment card on a contactless point of sale device to complete a purchase transaction.

In some situations, it may be desirable to provide an "on/off" switch in the payment card that allows the cardholder to selectively disable operation of the RFID chip. Unfortunately, the use of such a switch makes it difficult to manufacture and personalize the card.

DETAILED DESCRIPTION

In general, and for the purpose of introducing concepts of embodiments of the present invention, a proximity payment card includes a user-actuatable switch and an electrically conductive connection which is broken after the card has been personalized or during personalization. Before the connection is broken, the card is functionally enabled so that conventional personalization equipment can interact with the card to load account number data and other card-specific data into the card's RFID integrated circuit (IC). After the connection is broken, the card is functionally disabled unless the switch is actuated to enable the card.

In some embodiments, the connection may be broken by embossing the card number or other information on the card after the necessary data has been loaded into the card's RFID IC. In other embodiments, the connection may be broken by detaching a portion of the card body.

Figure 1:
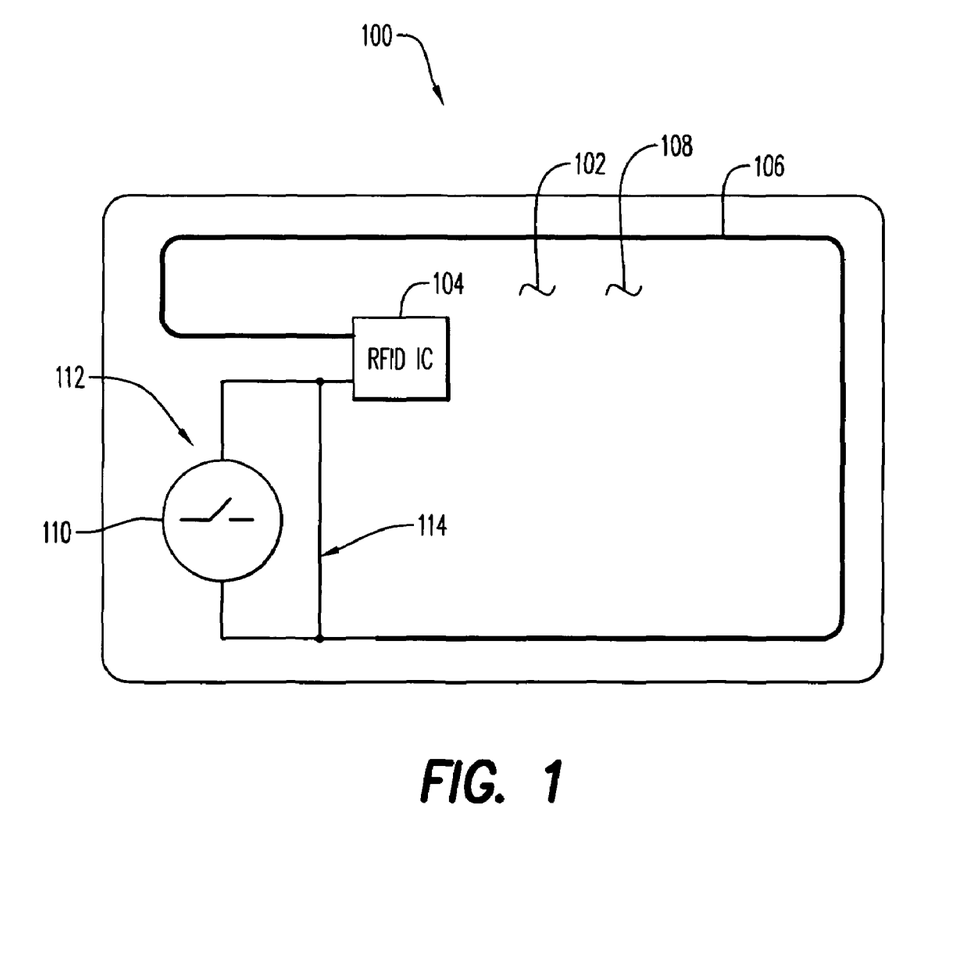
FIG. 1 is a schematic plan view of a proximity payment card according to some embodiments.

FIG. 1 is a schematic plan view of a proximity payment card 100 according to some embodiments. The proximity payment card 100 may include a card-shaped body 102, which may resemble conventional payment cards in shape and size. The card-shaped body 102 may be formed of plastic or another suitable material.

The proximity payment card 100 may also include an RFID IC 104. The RFID IC 104 may be mounted and/or installed in any suitable manner in the card-shaped body 102. For example, the RFID IC 104 may be embedded (partially or completely) in the card-shaped body 102. The RFID IC 104 may be suitably designed and configured to transmit payment card account information by radio frequency signaling to a POS terminal. In general, the RFID IC 104 may be designed and configured to operate in accordance with the "PayPass" standard promulgated by MasterCard International Incorporated, the assignee hereof.

The proximity payment card 100 may further include an antenna 106 embedded in or otherwise mounted on the card-shaped body 102. The antenna 106 may be in the form of one or more loops arranged along all or a portion of the periphery of the card-shaped body 102. Alternatively, the antenna 106 may be of a different type and/or configuration. The antenna may be operative generally in accordance with the above-mentioned PayPass standard to receive interrogation and power signals (which may be the same signal) from a proximity coupling device of a POS terminal and to transmit payment card account number information and/or other information to the proximity coupling device.

In some embodiments, lettering (not shown in FIG. 1) or other symbols (not shown in FIG. 1) may be present on the front surface 108 of the card-shaped body 102 and/or on the rear surface (not shown) of the card-shaped body 102. The proximity payment card 100 may have one or more magnetic stripes (not shown) on the card-shaped body 102 to allow the proximity payment card 100 to be read by a magnetic card reader.

Still further, the front surface 108 of the card-shaped body 102 may carry one or more logos and/or brands, including for example the brand/logo of a national payment card association such as MasterCard International Incorporated. The brand/logo of the issuer may also be present, as well as, for example, a specific card product brand. Other conventional features that may be present on the proximity payment card 100 (though such features are not shown) are an adhesive paper strip to receive the signature of the cardholder, and a security code or the like printed on the adhesive strip.

The proximity payment card 100 may also include a user-actuatable switch 110 that is supported in or on the card-shaped body 102 and that is electrically conductively coupled between the antenna 106 and the RFID IC 104. In some embodiments, the switch 110 may be formed of a pressure sensitive material such as a quantum tunneling composite (QTC—not separately shown) as described in WIPO publications WO 98/33193, WO 99/38173 and WO 00/79546. As would be understood from these publications and the disclosure hereof, pressure from the user's finger applied to the switch 110 may cause the conductive/non-conductive state of the switch 110 to change in a manner and/or to a degree that may complete a connection 112 between the antenna 106 and the RFID IC 104. However, other types of switches may alternatively be used, such as a membrane switch or a switch of a type disclosed in U.S. Pat. No. 6,863,220 issued to Selker. At times when the switch is not actuated (i.e., in a first state), the connection 112 is open-circuited. At times when the switch is actuated (i.e., in a second state), the connection 112 is complete.

The proximity payment card 100 also includes an electrically conductive connection 114 which short-circuits the switch 110. In other words, the connection 114 is parallel to and across the switch 110 and is between the RFID IC 104 and the antenna 106. Because of the presence of the connection 114, the RFID IC 104 is functionally coupled to the antenna 106 even when the switch 110 is in its unactuated state. Consequently, with the proximity payment card in its state shown in FIG. 1, the card is enabled to receive and respond to an interrogation signal or the like even at times when the switch 110 is not actuated. Moreover, with the connection 114 in place, the switch 110 does not operate to switch the card 100 between an operative condition and an inoperative condition, since the card 100 is always in an operative condition with the connection 114 in place.

Figure 2:
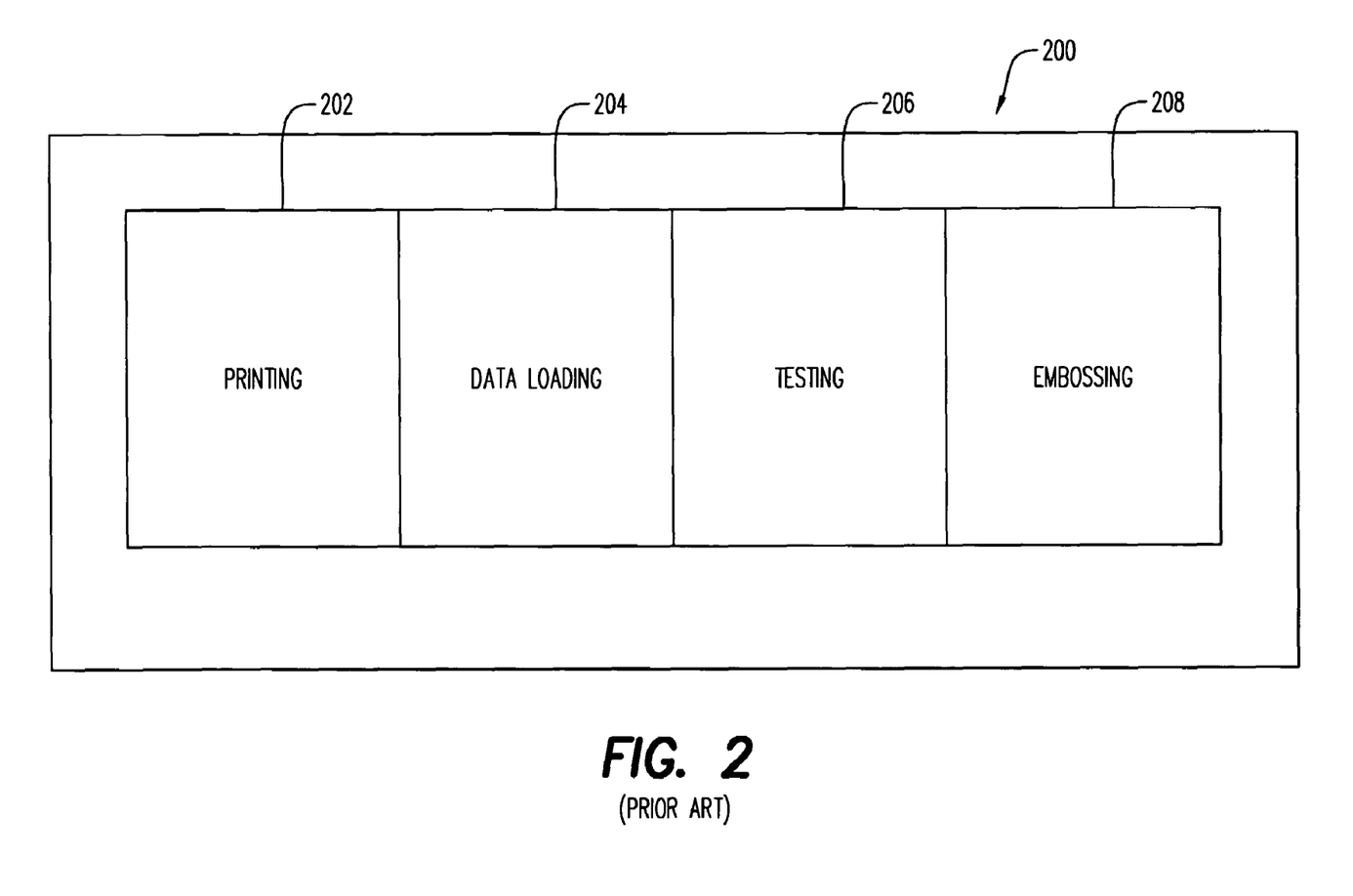
FIG. 2 is a high-level block diagram of conventional equipment that may be used to personalize the proximity payment card of FIG. 1.

FIG. 2 is a high-level block diagram of conventional equipment 200 that may be used to personalize the proximity payment card 100. As an alternative to using an entirely conventional piece of equipment to personalize the proximity payment card 100, equipment that departs to some extent from the conventional may be used. For example, the personalization equipment used with the card may include conventional processing modules that are in an order that differs from that of conventional personalization equipment. However, it is a feature of the proximity payment card 100 that it makes possible personalization processing with equipment that is the same as or similar to personalization equipment currently employed to personalize proximity payment cards that lack an on/off switch. That is, with a proximity payment card such as that illustrated in FIG. 2, it may not be necessary for card issuers to change their card personalization processes to accommodate the presence of an on/off switch on the cards. As a result, adding the on/off switch to the card may, if the card is as illustrated in FIG. 1, result in little or no inconvenience or increase in expense for card issuers.

Referring, then, to FIG. 2, the personalization equipment 200 may include card processing modules such as a printing module 202, a data loading module 204, a testing module 206 and an embossing module 208. Each of the modules 202-208 may be constructed and may operate in a conventional manner, except that, because of the configuration of the proximity payment card 100, the embossing module may, in addition to embossing an account number or the like on the card body, also operate to break the conductive connection 114. The module 202, 204, 206, 208 may be arranged in the order stated in the previous sentence, so that the modules operate one after the other in that order to process (personalize) a proximity payment card. It will be appreciated that the personalization equipment may also include a card transport mechanism (not separately shown) to transport proximity payment cards from one processing module to the next. It will also be recognized that, in accordance with conventional practices, the personalization equipment 200 may be configured to process large batches of proximity payment cards in seriatim fashion.

The modules 202, 204, 206 and 208 need not be in the order shown, but it may be desirable for the testing module 206 to be downstream from the data loading module 204, so as to test and confirm that card-specific data such as account number(s) and the account holder's name have been properly loaded into the card's RFID IC by the data loading module 204. Moreover, it may be desirable for the embossing module 208 to be downstream from the data loading module 204 and the testing module 206, so that data loading and testing are completed before embossing occurs, since the embossing breaks the conductive connection 114.

Figure 3:
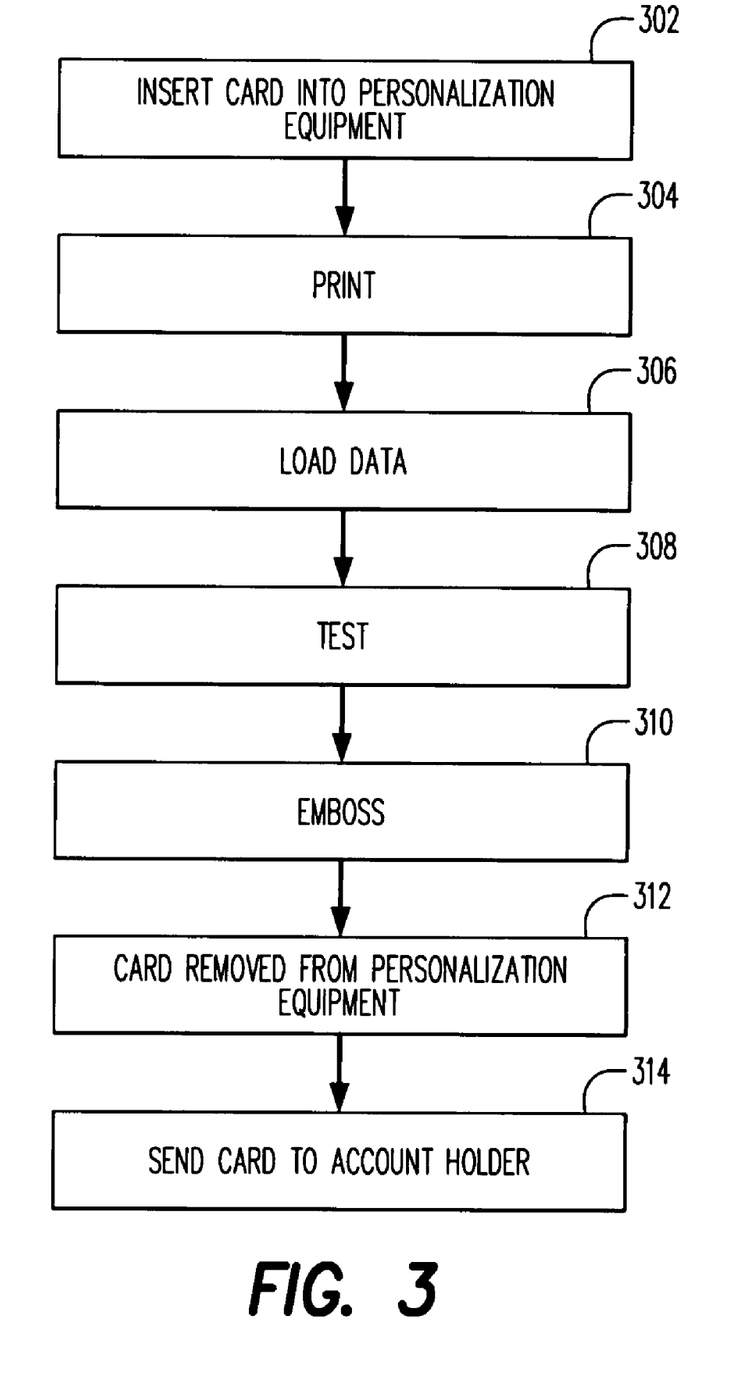
FIG. 3 is a flow chart that illustrates a process that may be performed in accordance with some aspects of the invention.

FIG. 3 is a flow chart that illustrates a process that may be performed in accordance with some aspects of the invention.

At 302 in FIG. 3, the proximity payment card 100 is inserted into the personalization equipment 200 (possibly as part of a batch of cards to be personalized). The card 100, at the time of introduction into the personalization equipment 200, may be in the form of a "blank" that includes only issuer-specific information, but not account-specific or account-holder-specific information.

At 304, the printing module 202 prints account-specific and/or account-holder-specific information on the card body. For example, the account holder's name may be printed, at this point, on the front of the card body, and some or all of the account number, and possibly also a security code, may be printed on a signature strip on the back of the card body.

At 306, the data loading module 204 may transmit information to the RFID IC of the proximity payment card and/or may exchange wireless (e.g., RF) signals with the RFID IC to load account-specific and/or account-holder-specific information into the RFID IC. This may also entail transmitting a power/interrogation signal to the proximity payment card to power-up the RFID IC. This is possible, notwithstanding that the switch 110 is not actuated (closed), because the conductive connection 114 is present to connect the RFID IC to the antenna 106. The same module 204 (or another which is not shown) may magnetically encode account-specific and/or account-holder-specific information on a magnetic stripe (not shown) carried by the card.

At 308, the testing module 206 may exchange wireless/RF signals with the RFID IC to confirm that the account-specific and/or account-holder-specific information has been properly stored in the RFID IC.

Figure 4:
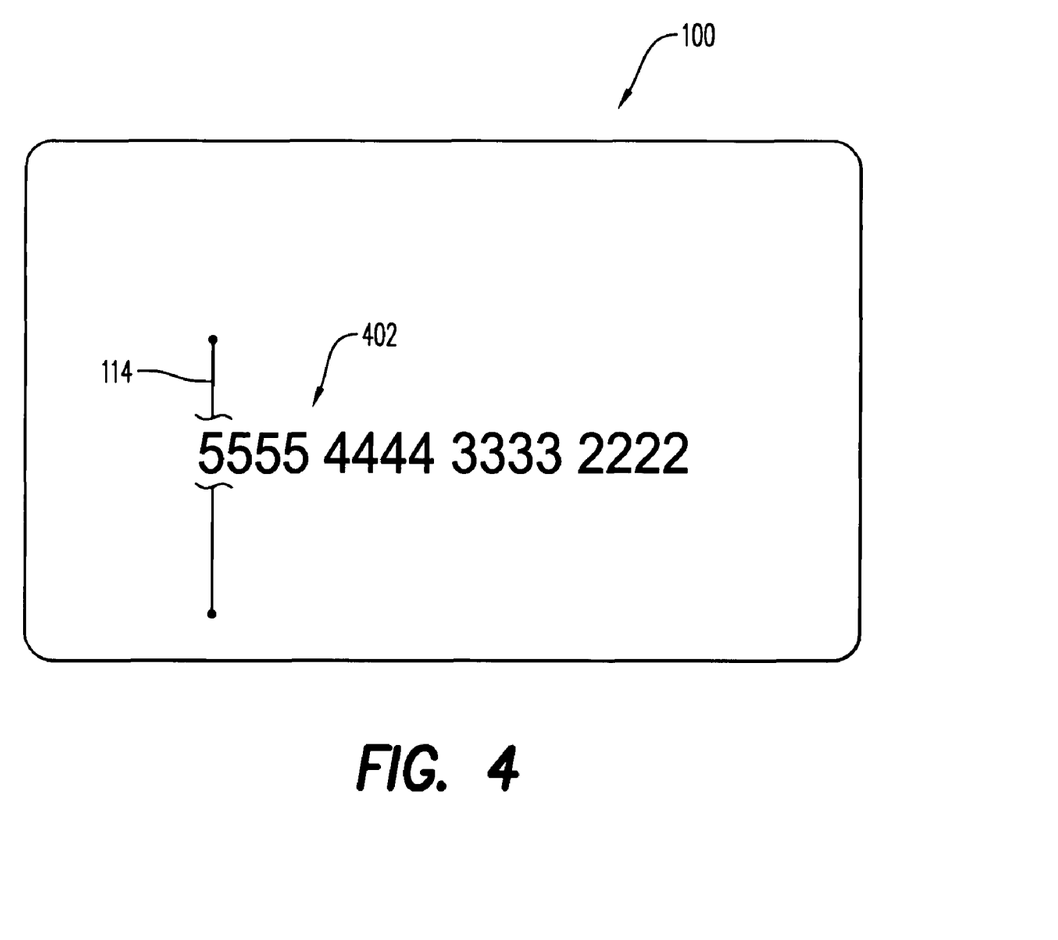
FIG. 4 is a view similar to FIG. 1, showing an aspect of the proximity payment card after completion of the process of FIG. 3, and with features of the card omitted.

At 310, the embossing module 208 may emboss information, such as the account number just stored in the RFID IC, into the card body. The embossing operation may result in breaking the conductive connection 114, as illustrated in FIG. 4. FIG. 4 is a schematic plan view of the proximity payment card (omitting a number of features of the card), showing the condition of the card after the embossing operation. An embossed account number produced by the embossing operation is indicated at 402. As schematically illustrated in FIG. 4, the locus of the embossed characters in the number 402 intersects with the locus of the conductive connection 114 so that the embossing operation disrupts the plane of the card body at the conductive connection 114, thereby breaking the conductive connection 114. As a result, the proximity payment card 100 is no longer always enabled to respond to an interrogation signal, but rather can now be enabled and disenabled, respectively, by actuating and de-actuating the switch 110 (FIG. 1, not shown in FIG. 4).

To summarize, because of the conductive connection 114, still in an unbroken condition at steps 306 and 308 in FIG. 3, the proximity payment card was enabled to allow for interaction between the data loading and testing modules with the RFID IC. Then embossing conveniently breaks the conductive connection 114, such that the switch 110 now functions as a security feature which must be actuated by the user to allow for subsequent interactions by external devices with the RFID IC.

Referring again to FIG. 3, at 312 the card is ejected/removed from the personalization equipment, having been completely personalized, and now being ready for mailing to the prospective cardholder. At 314, the card is sent to the cardholder.

Figure 5:
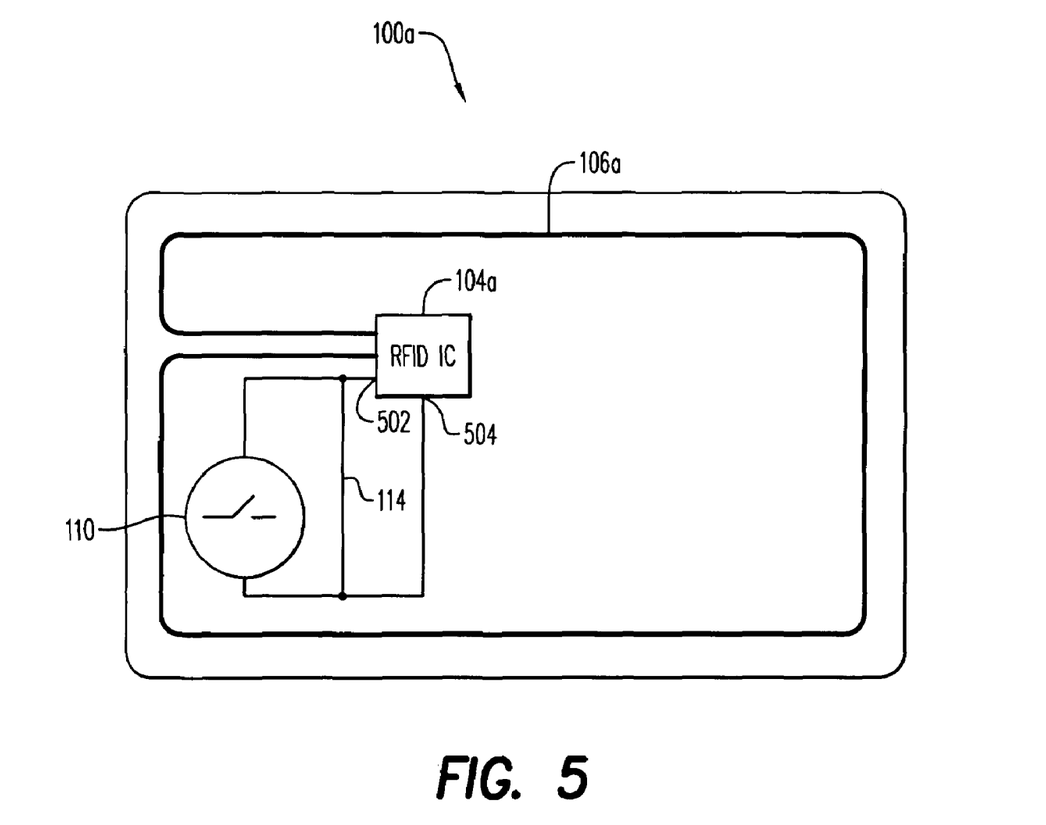
FIG. 5 is a schematic plan view of a proximity payment card according to some other embodiments.

In the proximity payment card 100 of FIG. 1, the switch 110 operates (after the conductive connection 114 is broken) to selectively connect the RFID IC 104 to the antenna 106, thereby selectively enabling the card. In an alternative embodiment of the proximity payment card, indicated generally at 100a in FIG. 5, the antenna 106a is permanently coupled to RFID IC 104a, and the switch 110 is connected across two terminals 502, 504 of the RFID IC 104a to selectively provide an enable signal to the RFID IC 104a. However, prior to personalization of the card 100a (and during data loading and testing portions of the personalization process), the switch 110 is shorted by conductive connection 114, so that the card 100a is operative notwithstanding that the switch is not actuated. The card 100a of FIG. 5 may be subjected to the same personalization process as the card 100 of FIG. 1, with the conductive connection also in this case being broken by the embossing operation to allow the switch 110 to switch the RFID IC, and hence the card 100a, between inoperative and operative conditions. In this case, the RFID IC may operate in the sense of being powered up by an interrogation signal when the conductive connection is in a broken state and the switch is not actuated, but may be inhibited from sending and/or receiving data from any external device, so that the card 100a is inoperative for purposes of performing a payment transaction and/or for transmitting an account number or other information when the conductive connection is broken and the switch is not actuated.

Figure 6:
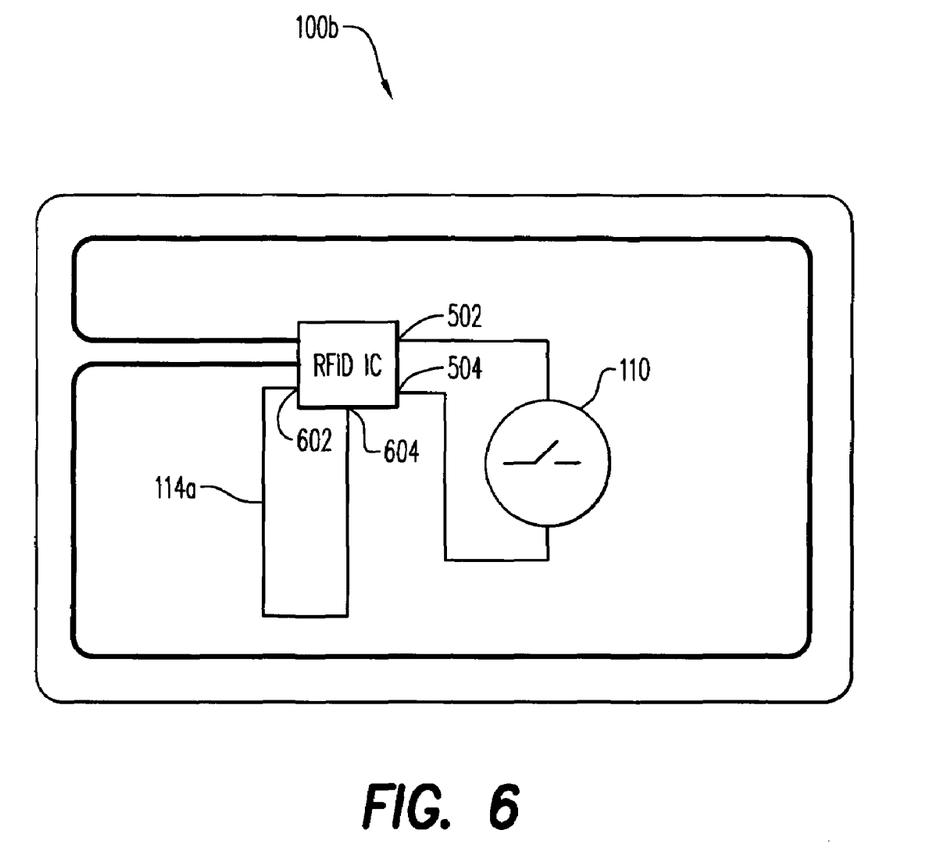
FIG. 6 is a schematic plan view of a proximity payment card according to still other embodiments.

Another alternative embodiment of a proximity payment card is indicated generally at 100b in FIG. 6. As in the embodiment of FIG. 5, the card 100b shown in FIG. 6 has an antenna that is always connected to the RFID IC, and has a switch 110 connected across terminals 502, 504 of the RFID IC. However, in the card 100b of FIG. 6, the conductive connection 114a to be broken by the embossing portion of the personalization process does not short the switch 110. Rather, the conductive connection may be coupled to two other terminals 602, 604 of the RFID IC to in effect provide an "override enable" signal to the RFID IC. Thus the RFID IC may be programmed and/or configured so that it is operable for payment transactions, data loading and/or testing operations and the like whenever either the conductive connection 114a is unbroken, or the switch 110 is actuated (or if both are the case). As before, the conductive connection 114a may be broken during the embossing portion of the personalization process to allow the switch to become operable to switch the card 100b between an inoperative state and an operative state.

In a variation on the embodiment of FIG. 6, the conductive connection is connected to one, but not both, of the RFID IC terminals between which the switch is connected. In this variation, the conductive connection also is connected to a second RFID IC terminal, which the switch is not connected to.

Figure 7:
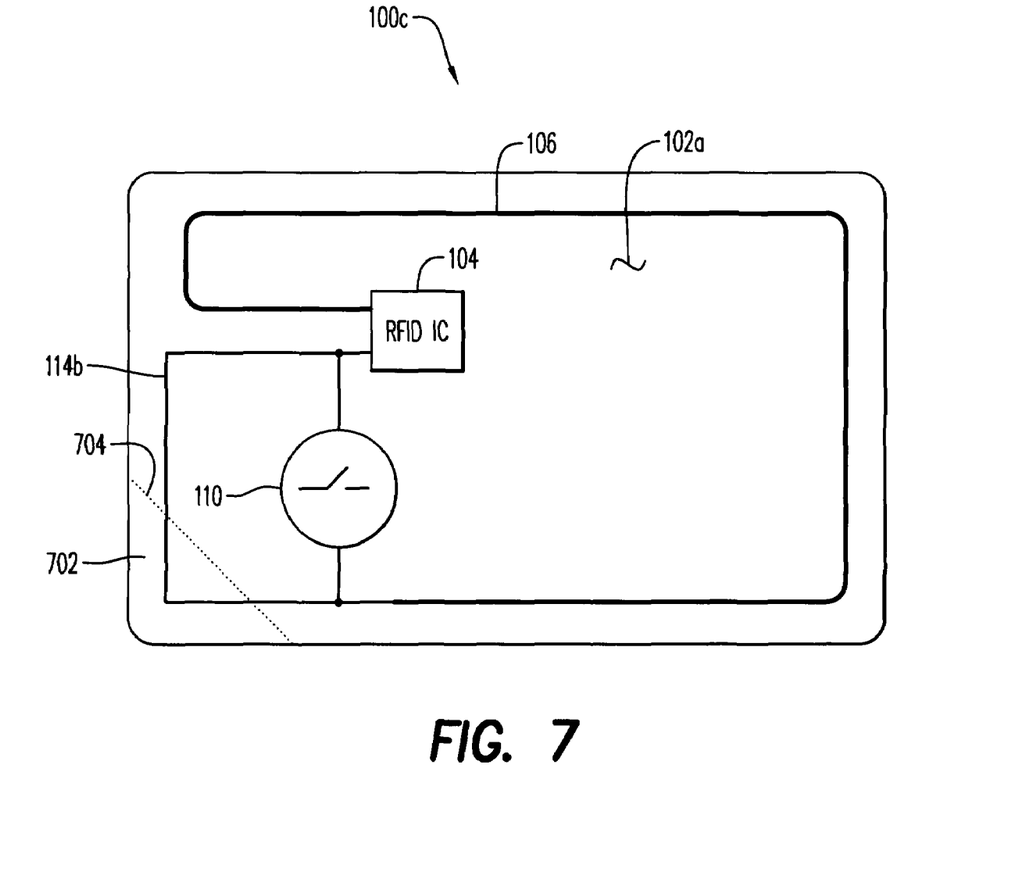
FIG. 7 is a schematic plan view of a proximity payment card according to yet other embodiments.
Figure 8:
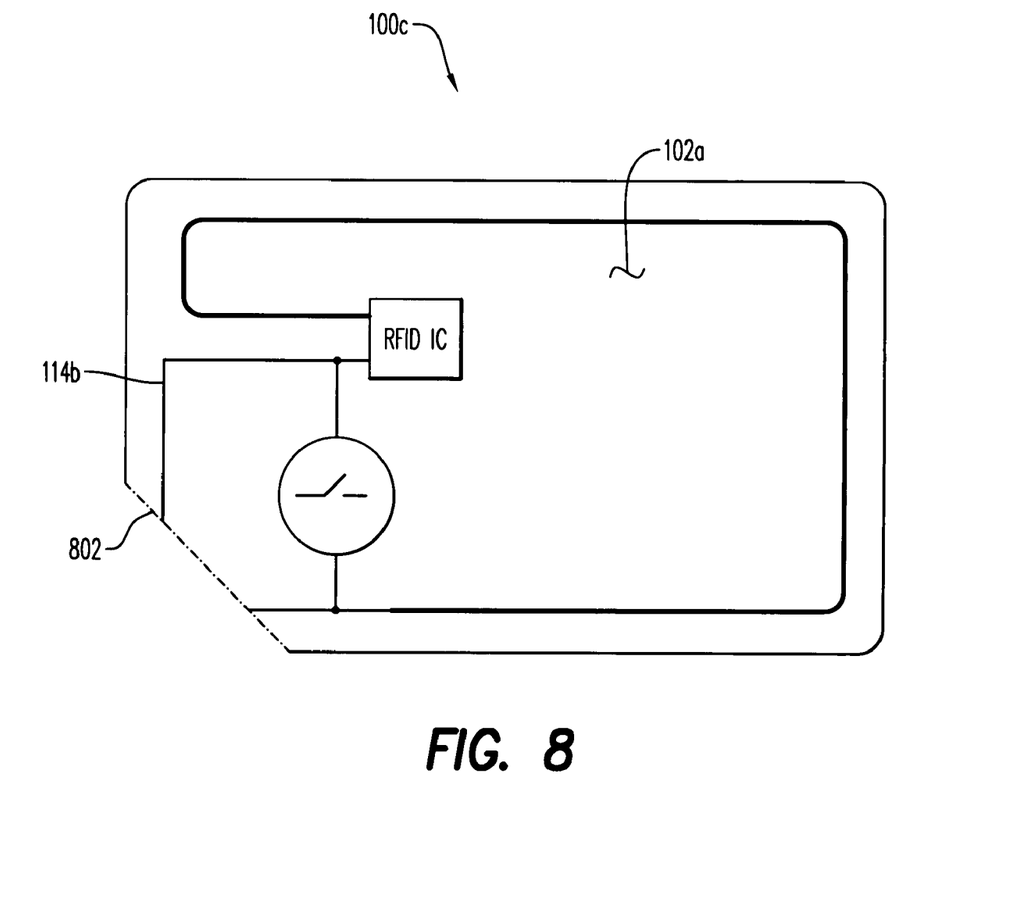
FIG. 8 is a view similar to FIG. 7, showing the card of FIG. 7 after it has been personalized and a portion detached therefrom.

Still another embodiment of the proximity payment card is indicated at 100c in FIG. 7. The card-shaped body 102a of the card 100c has a detachable corner portion 702. A scored line indicated as dotted line 704 defines the detachable portion 702 of the card 100c. As in the card 100 of FIG. 1, the switch 110 selectively connects the antenna 106 to the RFID IC 104. A conductive connection 114b shorts the switch 110 and passes through the detachable portion 702. That is, the conductive connection 114b crosses (twice) the scored line 704 in the card-shaped body 102a. With this arrangement, the conductive connection 114b may be broken by detaching the detachable portion 702 from the card-shaped body 102a, rather than as a result of an embossing operation. FIG. 8 (which omits a number of card features) shows the card 100c in a condition after the detachable portion has been removed to break the conductive connection 114b. In FIG. 8, the dash-dot line 802 represents the edge formed by breaking the card-shaped body 102a at the scored line.

Figure 9:
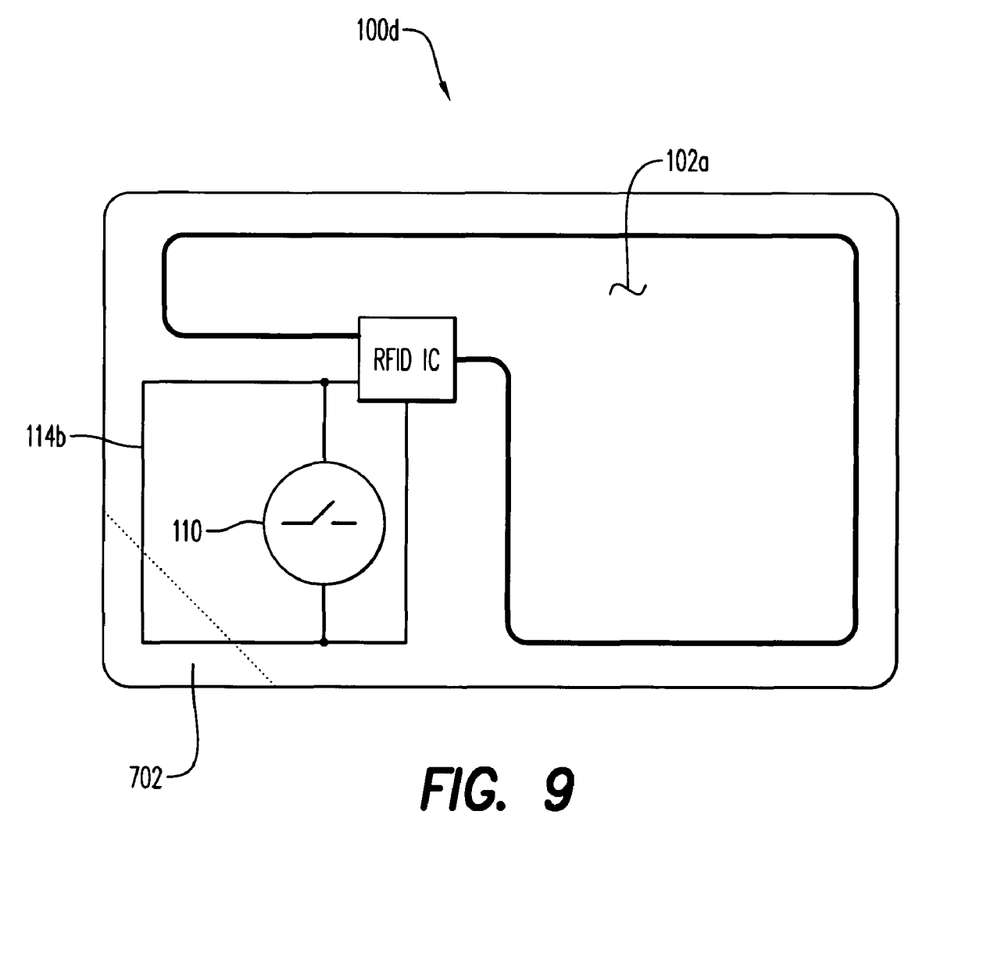
FIG. 9 is a schematic plan view of a proximity payment card according to further embodiments.

FIG. 9 shows yet another embodiment, indicated at 100d. The card 100d can be thought of as a hybrid of the embodiments of FIGS. 5 and 7. Like the embodiment of FIG. 7, the card 100d of FIG. 9 includes a card-shaped body 102a having a detachable corner portion 702 through which a conductive connection 114b passes. Like the embodiment of FIG. 5, the card 100d of FIG. 9 has its switch 110 connected between terminals 502, 504 of the RFID IC, and the switch is shorted by the conductive connection 114b. As in the embodiment of FIG. 5, the conductive connection is broken by detaching the corner portion after the card is personalized to allow the switch 110 to effectively switch the card on and off.

Figure 10:
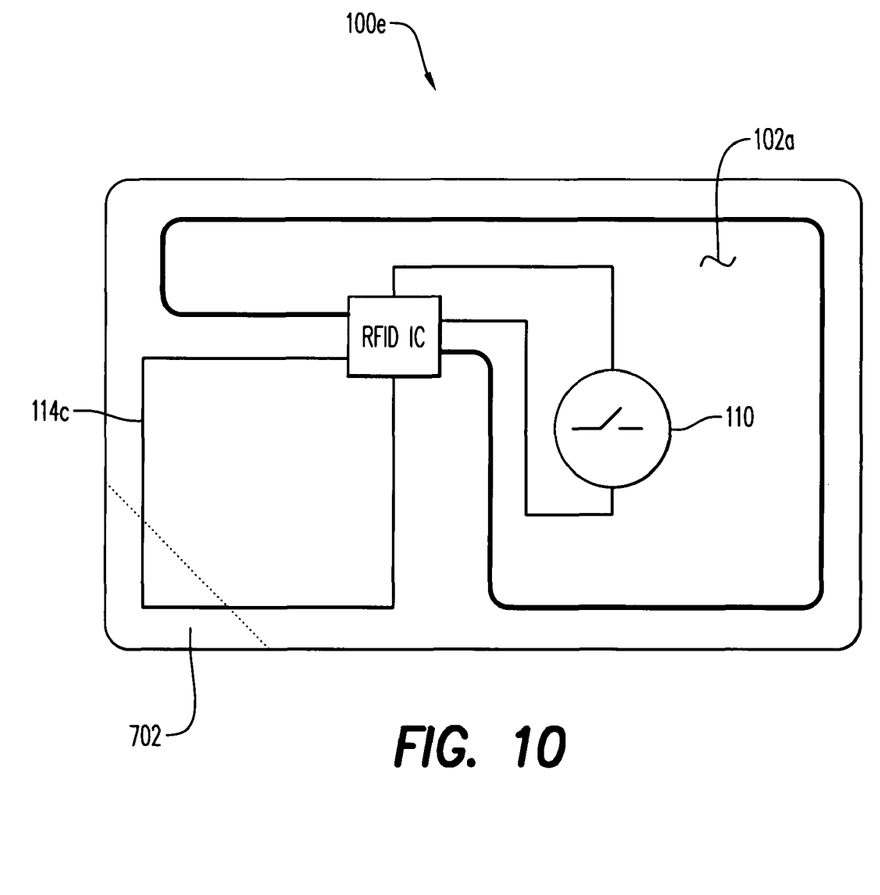
FIG. 10 is a schematic plan view of a proximity payment card according to still further embodiments.

A further embodiment shown in FIG. 10 is indicated at 100e. The card 100e can be thought of as a hybrid of the embodiments of FIGS. 6 and 7. Again the embodiment of FIG. 10 has a card-shaped body 102a with a detachable corner portion 702, but in this case the conductive connection 114c is between two terminals of the RFID IC that are different from the two terminals between which the switch 110 is connected. In another variation, the conductive connection shares one but not both of the RFID IC terminals for the switch, but is also connected to an RFID IC terminal that the switch is not connected to. In either the variation described in the previous sentence or in the embodiment shown in FIG. 10, the detachable corner portion may be removed after the card has been personalized to bring the switch into play for selectively enabling the card.

The proximity payment card embodiments described in connection with FIGS. 7, 9 and 10 may be subjected to a personalization process substantially as described above in connection with FIG. 3, except that in the personalization process applied to the cards of FIGS. 7, 9 and 10, the embossing operation does not result in breaking the conductive connection. As in other embodiments, the personalization of the cards of FIGS. 7, 9 and 10 may be performed with conventional personalization equipment and/or in a substantially conventional manner. According to some approaches for processing the cards of FIGS. 7, 9 and 10, the detachable portion may be removed by the card issuer, but according to other approaches, the card may be sent to the user with the corner portion still in place, and the user may elect either (a) to keep the card-body intact so that the switch need not be actuated to use the card, or (b) to detach the corner portion, thereby breaking the conductive connection and thereby making operation of the switch necessary for execution of a payment transaction with the card.

The cards illustrated in FIGS. 7, 9 and 10 may alternatively be personalized in a manner that does not include embossing.

In some alternative embodiments of the invention, a conductive connection may be broken in some way other than by embossing the card body or detaching a detachable portion of the card body. For example, the conductive connection may be broken by punching a hole in the card body at the locus of the conductive connection.

Embodiments of some aspects of the invention have heretofore been described with reference to a card-shaped proximity payment device, but the teachings disclosed herein are also applicable to proximity payment devices which are not card-shaped. As used herein and in the appended claims, "proximity payment device" refers to any device, whether or not card shaped, which transmits to a point of sale terminal, by wireless transmission, a payment account number.

The card-shaped bodies referred to herein may be dimensioned in accordance with standard card sizes, such as the well-known ID1 and ID000 sizes, or may alternatively be of any convenient size.

In the embodiments with the detachable portions, a notch with curved edges may be formed at each of the locations where the scored line meets the edge of the card body. As a consequence, the detachable portion, after being detached, may have only rounded corners, and such may also be the case for the card itself after the detachable portion has been detached. Notches of this sort are disclosed, for example, in co-pending provisional patent application Ser. No. 60/857,009, filed Nov. 6, 2006.

Although not indicated in the drawings, one or more of the proximity payment devices may have a contact interface like that of a conventional smart card that includes a contact interface.

The principles taught herein have heretofore been described in the context of proximity payment devices. Nevertheless, these teachings are also applicable to cards or the like issued by transportation systems (e.g., mass transit systems) for access to the transportation systems; to cards used to identify the holder for purposes apart from or in addition to transaction payments; and to so-called electronic passports (also known as RFID-enabled passports). As used herein and in the appended claims, the term "identification token" refers to an object that serves as one or more of a proximity payment device, a transportation card, an identification card and/or an RFID-enabled passport. The term "transportation card" refers to a card or similar device used to pay, or confirm or evidence payment of, a charge for using a transportation system. The term "RFID-enabled passport" refers to an internationally recognized travel document that includes an IC and an antenna and communicates with a terminal by a wireless communication technique.

An item is to be considered "supported by" a body if mounted on or partially or entirely embedded in the body.

As used herein and in the appended claims, "personalizing" and "personalization" refer to any one or more of operations in which card- or account-specific information is applied to the card, and thus includes printing and/or embossing information on the card, storing data in the card RFID IC and/or magnetically coding information in a magnetic stripe on the card.

In some embodiments in which the switch is connected between two terminals of the RFID IC, and assuming the conductive connection has been broken, the card may be operative for a payment transaction only at times when the switch is in its closed state. However, in other embodiments in which the switch is connected between two terminals of the RFID IC, and again assuming that the conductive connection has been broken, the card may be operative during a predetermined period of time after the switch has been actuated and then released.

The above description and/or the accompanying drawings are not meant to imply a fixed order or sequence of steps for any process referred to herein; rather any process may be performed in any order that is practicable, including but not limited to simultaneous performance of steps indicated as sequential.

As used herein and in the appended claims, the term "embedded" includes both completely and partially embedded.

As used herein and in the appended claims, the term "identification code" refers to a payment card account number or any other number or code that is stored in and transmitted by the RFID IC of an identification token.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A method comprising:
   providing an identification token which includes a radio frequency identification (RFID) integrated circuit (IC), an antenna and a switch, said switch being normally in a first state and being actuatable by a user's finger to a second state different from said first state, said identification token including a conductive connection connected to at least one of said RFID IC and said antenna, said identification token being enabled to send and receive signals so long as said conductive connection is unbroken;
   personalizing said identification token; and
   breaking said conductive connection;
   wherein:
   after said conductive connection is broken, said switch is operable to switch the identification token from an inoperative condition to an operative condition; and
   before said conductive connection is broken, said switch is actuatable from said first state to said second state but is not operative to switch the identification token from said inoperative condition to said operative condition.

2. The method of claim 1, wherein said conductive connection, prior to being broken, is connected to short-circuit said switch.

3. The method of claim 1, wherein said switch is open in said first state, and is at least partially electrically conductive in said second state.

4. The method of claim 3, wherein said switch open-circuits a connection between said antenna and said RFID IC when said switch is in said first state, and said switch completes said connection between said antenna and said RFID IC when said switch is in said second state.

5. The method of claim 1, further comprising:
   testing said personalized identification token prior to breaking said conductive connection.

6. The method of claim 1, wherein said personalizing includes storing at least one identification code in the RFID IC.

7. The method of claim 6, wherein said storing includes wirelessly transmitting said at least one identification code to said identification token.

8. The method of claim 7, wherein said at least one human-readable character includes at least one digit of a payment account number stored in said RFID IC.

9. The method of claim 1, wherein:
   said identification token includes a card-shaped body which supports said RFID IC, said antenna and said switch; and
   said breaking of said conductive connection is performed by embossing at least one human-readable character in said card-shaped body.

10. The method of claim 1, wherein:
    said identification token includes a card-shaped body which supports said RFID IC, said antenna and said switch; and said breaking of said conductive connection is performed by detaching from said card-shaped body a portion of said card-shaped body, said portion including a portion of said conductive connection.

11. The method of claim 10, wherein said detaching is performed by snapping off said portion of said card-shaped body along a scored line that defines said portion of said card-shaped body relative to said card-shaped body.

12. An identification token, comprising:
a plastic body;
a radio frequency identification (RFID) integrated circuit (IC) supported by said plastic body;
an antenna supported by said plastic body;
a normally-open switch that is actuatable by a user's finger and is supported by said plastic body; and
a conductive connection parallel to said switch to short-circuit the normally-open switch said conductive connection functionally coupling the antenna to the RFID IC even when the switch is in an unactuated condition.

13. The identification token of claim 12, wherein said switch open-circuits a connection between said antenna and said RFID IC when said switch is in an open condition, and said switch completes said connection between said antenna and said RFID IC when said switch is in a closed condition.

14. The identification token of claim 12, wherein said plastic body is substantially card-shaped.

15. The identification token of claim 12, wherein:
said plastic body includes a detachable portion defined by a scored line in said plastic body; and
said conductive connection passes through said detachable portion of said plastic body.

16. An identification token comprising:
a card-shaped plastic body having human-readable characters embossed therein;
a radio frequency identification (RFID) integrated circuit (IC) supported by said plastic body;
an antenna supported by said plastic body;
a normally-open switch that is actuatable by a user's finger and is supported by said plastic body, wherein actuation of said switch allows for interactions by external devices with the RFID IC; and
a conductive connection embedded in said plastic body and broken at one of said embossed human-readable characters.

17. The identification token of claim 16, wherein said identification token is operative to perform a payment card transaction when said switch is in a closed condition and said identification token is not operative to perform a payment card transaction when said switch is in an open condition.

18. The identification token of claim 17, wherein said switch open-circuits a connection between said antenna and said RFID IC when said switch is in said open condition, and said switch completes said connection between said antenna and said RFID IC when said switch is in said closed condition.

19. A method comprising:
providing an identification token which includes a card-shaped plastic body, a radio frequency identification (RFID) integrated circuit (IC) supported by said plastic body, an antenna embedded in said plastic body, a normally-open switch supported by said plastic body, and a conductive connection embedded in said plastic body and connected to short-circuit said switch;
storing information in said RFID IC by wirelessly transmitting said information to said antenna;
testing said identification token by exchanging wireless communication with said identification token; and
after said storing and testing, embossing at least one human-readable character in said plastic body, said embossing causing said conductive connection to be broken such that said switch is operable to switch said identification token between an inoperative condition and an operative condition.

20. The method of claim 19, wherein said at least one human-readable character includes numerals that represent said at least one payment account number stored in said RFID IC.

21. The method of claim 19, wherein said switch is connected between said antenna and said RFID IC, and said conductive connection is, prior to said embossing, connected between said antenna and said RFID IC.

22. The method of claim 19, wherein said testing includes causing the identification token to transmit information stored in said RFID IC.

23. The method of claim 19, wherein said storing includes wirelessly transmitting a power signal to said identification token.

24. A method comprising:
providing an identification token which includes a card-shaped plastic body, a radio frequency identification (RFID) integrated circuit (IC) supported by said plastic body, an antenna embedded in said plastic body, a normally-open switch supported by said plastic body, and a conductive connection embedded in said plastic body and connected to short-circuit said switch;
storing information in said RFID IC by wirelessly transmitting said information to said antenna;
testing said identification token by exchanging wireless communication with said identification token; and
after said storing and testing, detaching a portion of said plastic body to break said conductive connection.

25. The method of claim 24, wherein said switch is connected between said antenna and said RFID IC, and said conductive connection is, prior to said detaching, connected between said antenna and said RFID IC.

26. The method of claim 24, wherein said testing includes causing the identification token to transmit an identification code stored in said RFID IC.

27. The method of claim 24, wherein said storing includes wirelessly transmitting a power signal to said identification token.

28. An identification token, comprising:
a card-shaped plastic body which includes a detachable portion defined by a scored line in said plastic body;
a radio frequency identification (RFID) integrated circuit (IC) supported by said plastic body, said RFID IC including a plurality of terminals;
an antenna supported by said plastic body;
a normally-open switch that is actuatable by a user's finger and is coupled to at least one of said terminals of said RFID IC; and
a conductive connection that passes through said detachable portion of said plastic body, said conductive connection connected to at least one terminal of said RFID IC.

* * * * *